US010803299B2

(12) United States Patent
Slamka (10) Patent No.: US 10,803,299 B2
(45) Date of Patent: Oct. 13, 2020

(54) SYSTEM TO OVERCOME THE TWO-DIMENSIONAL NATURE OF THE CAPTURED IMAGES WHEN ATTEMPTING TO GENERATE THREE-DIMENSIONAL MEASUREMENT DATA

(71) Applicant: Echo-Sense, Inc., Camas, WA (US)

(72) Inventor: Milan Slamka, Camas, WA (US)

(73) Assignee: Echo-Sense, Inc., Camas, WA (US)

( * ) Notice: Subject to any disclaimer, the term of this patent is extended or adjusted under 35 U.S.C. 154(b) by 222 days.

(21) Appl. No.: 15/922,627

(22) Filed: Mar. 15, 2018

(65) Prior Publication Data
US 2018/0268204 A1    Sep. 20, 2018

Related U.S. Application Data

(60) Provisional application No. 62/472,158, filed on Mar. 16, 2017.

(51) Int. Cl.
| | |
|---|---|
| *G06T 15/10* | (2011.01) |
| *G06T 7/70* | (2017.01) |
| *G06K 9/00* | (2006.01) |

(52) U.S. Cl.
CPC ..... *G06K 9/00288* (2013.01); *G06K 9/00281* (2013.01); *G06T 7/70* (2017.01); *G06T 15/10* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | |
|---|---|---|
| 7,050,994 B1 | 5/2006 | Mcintyre et al. |
| 2006/0007344 A1 | 1/2006 | Neufeld |
| 2012/0300076 A1 | 11/2012 | Aimura et al. |
| 2013/0135427 A1 | 5/2013 | Wu et al. |
| 2016/0066085 A1 | 3/2016 | Chang et al. |
| 2016/0292511 A1 | 10/2016 | Ayalasomayajula et al. |
| 2019/0080155 A1* | 3/2019 | Ganong ............. G06K 9/00677 |

* cited by examiner

*Primary Examiner* — Idowu O Osifade
(74) *Attorney, Agent, or Firm* — FisherBroyles LLP; Kevin D. Jablonski (57) ABSTRACT

A system and method for capturing images and reconstructing full images based on the captured image for identification. An image captured by streamed video is used to identify an image of an individual based on facial recognition algorithms. Features of the individual's face image are identified and used for determining measurement and alignment of the individual face image. Based on the measurement and alignment of the individual face image, further facial images of the individual are extrapolated and reconstructed. The reconstructed facial images of the individuals are compared with facial data stored in a database and the identification of the individual is performed.

20 Claims, 9 Drawing Sheets

SYSTEM TO OVERCOME THE TWO-DIMENSIONAL NATURE OF THE CAPTURED IMAGES WHEN ATTEMPTING TO GENERATE THREE-DIMENSIONAL MEASUREMENT DATA

PRIORITY CLAIM TO RELATED PROVISIONAL APPLICATION

The present application claims priority and benefit from the U.S. Provisional Patent Application No. 62/472,158, filed Mar. 16, 2017 and titled, "SYSTEM TO OVERCOME THE TWO-DIMENSIONAL NATURE OF THE CAPTURED IMAGES WHEN ATTEMPTING TO GENERATE THREE-DIMENSIONAL MEASUREMENT DATA". The entire content of the provisional application is expressly incorporated herein by reference.

CROSS REFERENCES TO RELATED APPLICATIONS

The present application refers a commonly-assigned U.S. patent application Ser. No. 15/922,614, entitled "SYSTEM AND METHOD FOR CONCURRENT DATA STREAMS FROM A SINGULAR SENSOR WITH REMOTELY SELECTABLE PARAMETERS" filed on Mar. 15, 2018, the disclosures of which are incorporated herein by reference.

BACKGROUND

Facial recognition is technology that utilizes captured images to compare data points of a one or more person's faces from the captured images. The faces may be identified at first by specific features common to all faces, like the presence of eyes, a nose, a mouth, and the like. Then, particular data measurements may be conducted to further delineate between facial features of various people that are within captured images. This may then typically lead to analyzing collected facial feature data against a database of facial feature data in an attempt to identify, with greater certainty, the people in the captured images.

Such a system may sometimes rely upon several views of a person's face so as to be able to make more accurate data measurements. Having different angle views can be used to overcome the two-dimensional nature of the captured images when attempting to generate three-dimensional measurement data. In most live situations where the video capture is superfluous to the actual situation, (e.g., a police officer engaged in an arrest), the myriad views of a person's face may not readily be available. As a consequence, incomplete information may be used to analyze the data measurements against the database and this may lead to more inaccurate identification.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, various embodiments as described below with respect to the accompanying figures are directed to a system and method for capturing and sending pictorial frames to a server computer that is configured to execute a resident facial recognition program. The facial recognition program performs a variety of mathematical operations on the pictorial frame and compares it to series of facial references regenerated from standard front view and side views of individuals (e.g., so-called mug shots). The stored mug shots have also undergone similar mathematical operation for comparison to the captured pictorial frame/s to determine if match exists. One aspect of such reference processing is to obtain several different views derived from one or two mug shots thereby increasing probability of subject identification. Further, low resolution camera pictures are typically used for taking "subject snapshots", so some details are absent thereby making facial recognition more challenging without regeneration of several views. These and other aspects are discussed below with respect to FIGS. 1-9.

Figure 1:
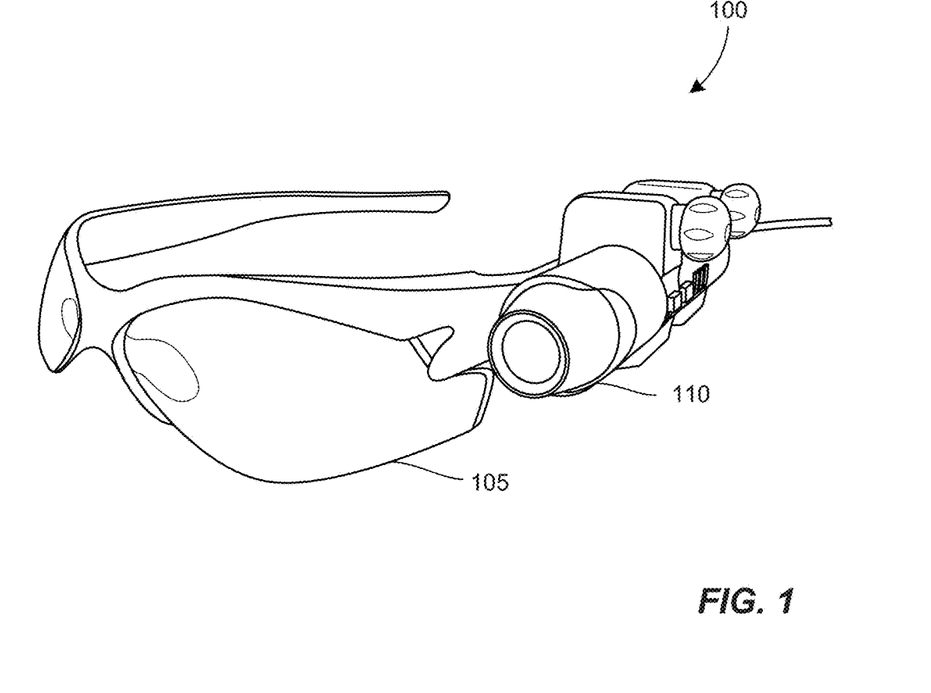
FIG. 1 is a schematic illustration of an audio and video capture device and system according to an embodiment of the present disclosure.
Figure 2:
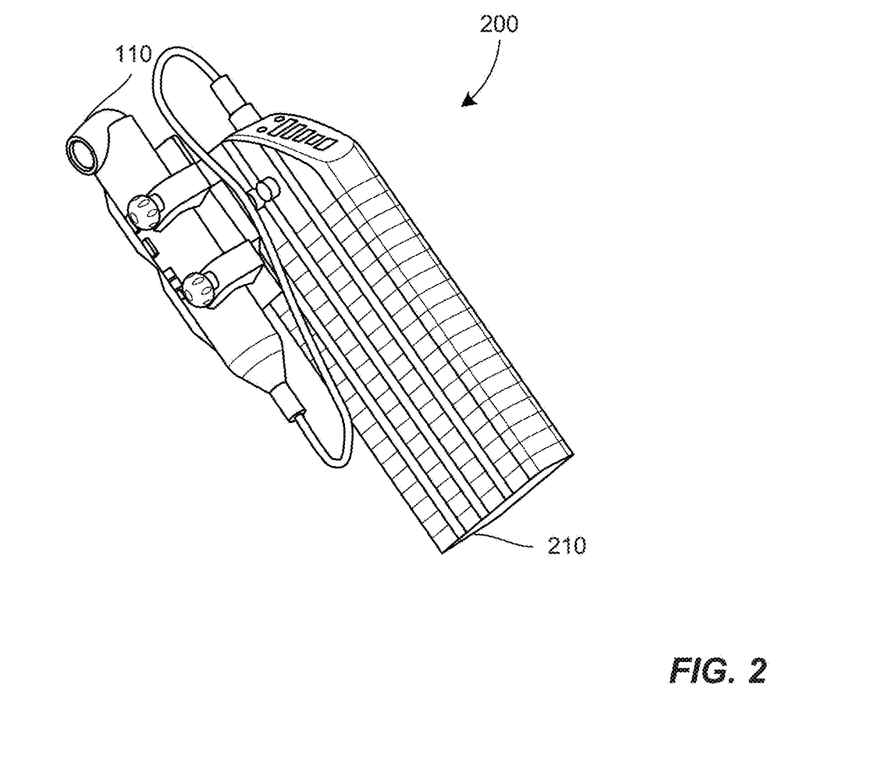
FIG. 2 is a schematic illustration of a docking station for the audio and video capture device and system of FIG. 1 according to an embodiment of the present disclosure.

Referring initially to FIGS. 1 and 2, a device is illustrated according to various exemplary embodiments of the present disclosure. In general, the device provides a means for capturing audio and video recordings in real time and then facilitating the communications of the real-time audio and video signals to a remote location through a docking station (shown in FIG. 2).

FIG. 1 is a schematic illustration of an audio and video capture device 100 and system according to an embodiment of the present disclosure. As shown in FIG. 1, the audio/video device 100 can include a camera 110. The camera 110 can gather video images (i.e., moving images or video) or still images (i.e., photographs or pictures). Moreover, the camera 110 can gather video images at any suitable number of frames per minute and at any suitable resolution. In some embodiments, the camera 110 can be a night-vision camera for capturing images in low light levels. Thus, as will be discussed, the camera 110 can gather images of the area surrounding the particular officer or scout (i.e., images of the immediate area to the scout). The gathering of images includes gathering images of faces of individuals that may be transmitted to a computing base station for facial recognition analysis in real-time or near-real-time.

The audio/video device 100 as scouting device can also include a transceiver (discussed further below with respect to FIG. 3). The transceiver can provide two-way communication between the scouting device 100 and the monitoring user at a remote location as will be discussed.

The scouting device 100 can further include an input transducer (discussed further below with respect to FIG. 3), such as a microphone, a keyboard, buttons, etc. Information to be transmitted from the scout to the monitoring user can be input by the scout into the input transducer.

In addition, the scouting device 100 can include an output transducer (discussed further below with respect to FIG. 3), such as a speaker, a display, etc. Information received from the monitoring user by the scout can be output to the scout 12 by the output transducer.

The scouting device 100 can additionally include a positioning device (not shown). In some embodiments, the positioning device can be linked to a regional satellite navigation system or a global satellite navigation system, such as GPS (the Global Positioning System), GLONASS, or Galileo, so that the positioning device can automatically detect the position (e.g., latitude and longitude) of the scouting device 100. In some embodiments, the positioning device can also automatically detect and update the position of the device while the device moves. Updating and refreshing of the scout's current position can occur at any predetermined time interval.

Furthermore, the scouting device 100 can include a memory unit (not shown). The memory unit can be a computerized memory unit including RAM, ROM, or other type of memory, and the memory unit can have any suitable capacity. The memory unit may accordingly incorporate either volatile memory or non-volatile memory (such as either NAND or NOR flash memory). In some embodiments, the memory unit can save images gathered by the camera 110 or other information so that the information can be reviewed or transmitted at a later time.

The scouting device 100 may also include at least one power source (not shown), which may supply power to any or all of the parts of the scouting device 100. The power source may be, for example, a lithium ion battery, but in various embodiments the power source may alternatively be one or more of another type of rechargeable battery (such nickel-cadmium batteries), or one or more non-rechargeable batteries (such alkaline batteries). Moreover, in some embodiments, the power source may include an adapter operable to plug in to an electrical outlet. When plugged into an electrical outlet, the power source may supply power to the various parts of the scouting device 100 from a battery, or from the electrical outlet, or from both.

It will be appreciated that the scouting device 100 can be a portable unit. For instance, in some embodiments, at least some components of the scouting device 100 (e.g., the transceiver and/or the transducers) can be incorporated in a cellular telephone or other portable device. The camera 110 can be connected to the cellular telephone via a USB or other type of connector, whether wired or wireless.

In some embodiments, the scouting device 100 may be connected to the cellular telephone by an isochronous USB 2.0 connection, or by another type of isochronous interface. The scouting device 100 can transmit data serially or in parallel. In some embodiments, the scouting device 100 can transmit data both serially and in parallel. For example, the connector may be a high-performance serial bus or high-speed serial interface, such as an IEEE 1394 interface (a.k.a. FireWire), or a SATA (Serial ATA) interface, or a PCI Express interface, a USB 3.0 interface. In other embodiments, the scouting device 100 may transmit data wirelessly, such as by a Bluetooth™ connection.

In addition, in some cases, the scouting device 100 can be such that the camera 110 substantially takes photographs or gathers video images of objects that are in the line of vision of the scout. Additionally, the device may include means for detecting and providing an orientation, such as a magnetometer. For example, the positioning device may include an orientation device, and may thus automatically detect and update both the position and the orientation of the scouting device 100 within the environment. That is, the device may detect a direction (such as a direction on a map) in which camera is pointing. The scouting device 100 may thereby detect the direction of the line of vision of the scout.

However, it will be appreciated that the scouting device 100 could be incorporated into any suitable portable unit, and that the camera could be mounted to any other portion of the scout's body or belongings. For example, the scouting device 100 can be mounted onto glasses 105, or some other areas, including hat, helmet, collar, epaulette or chest of an officer. The scouting device 100 can rotate and secure onto the officer with various means, including clips or other secured attachments. In additional embodiments, the camera 110 can be removably mounted to the scout's body or belongings (e.g., a clip-on camera that removably clips onto the scout's body or belongings).

Accordingly, parts of the scouting device 100—such as the camera 110, the transceiver, the input transducer, the output transducer, the positioning device, the memory unit, and the power source—may be integrated with each other in a variety of ways. For example, one or more of the camera, the input transducer, and the output transducer may be operably secured within or incorporated in a removable head-mounted device such as a pair of glasses or sunglasses 105.

Similarly, one or more of the positioning device, the memory unit, the power source, and the transceiver may be incorporated in a portable unit or device, such as a cellular telephone. In some configurations, the transceiver may be incorporated in a cellular telephone, while other parts of the scouting device 100 (such as the camera, the transceiver, the input transducer, and the output transducer) may be integrated with each other outside of the cellular telephone. In other configurations, some parts of the scouting device 100, such as the input transducer and the output transducer, may be partially incorporated in a removable head-mounted device, and partially incorporated in a portable unit or device. FIG. 2 is a schematic illustration of a docking station 210 for the audio and video capture device and system of FIG. 1 according to an embodiment of the present disclosure. (discussed further below with respect to FIGS. 4A/B)

Figure 3:
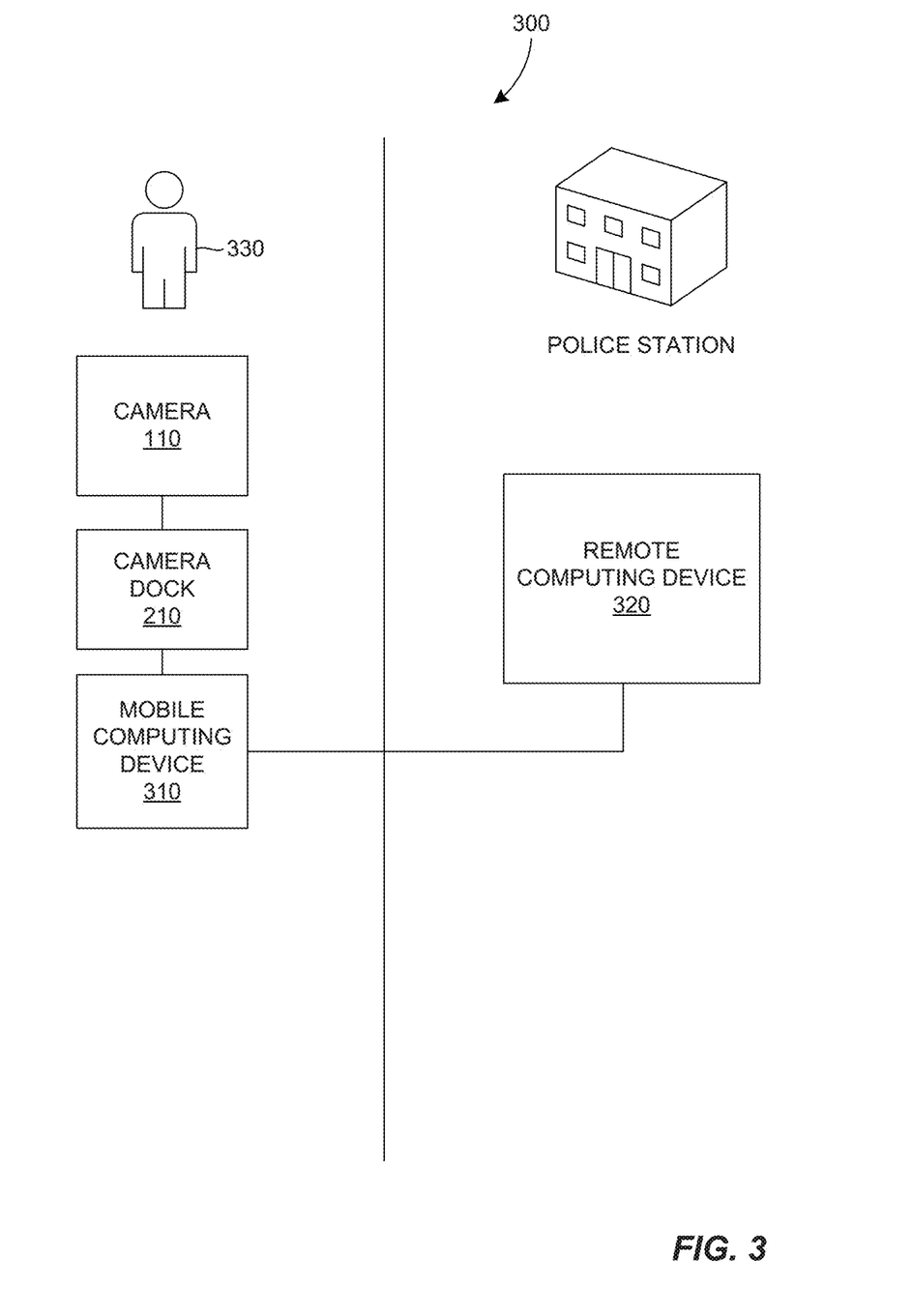
FIG. 3 is a system diagram of a system for remotely capturing video data streams and communicating the captured video data streams to a computing system for facial recognition analysis according to an embodiment of the present disclosure.

FIG. 3 is a system diagram 300 of a system for remotely capturing video data streams and communicating the captured video data streams to a computing system for facial recognition analysis utilizing the audio and video capture device and system of FIG. 1 according to an embodiment of the present disclosure. In general, the system may include an individual (officer or scout) 330 at a location that is using the devices of FIGS. 1 and 2, namely, a camera 110, a camera dock 210, and a mobile computing device 310. These devices may be in communicative contact with a remote computing device 320 that be at a local management station. The remote computing device 320 may be configured to monitor some of all of the data being captured by the scouting device 100 and further configured to provide real-time facial recognition analysis for some of the images received from the camera and camera dock system.

The analysis computer 320 can generally include a transceiver (not shown). The transceiver can provide two-way communication with the transceiver of the device as will be discussed in greater detail in FIG. 3. The analysis computer 320 can also have access to a database (not shown). The database can include a memory, which may in turn contain a variety of stored data. The stored data can be in the form of previously captured facial data, maps, a listing of certain locales, previously saved longitude and latitude of certain locales, etc. The stored data can also include images, such as still images or video images captured by the cameras in the devices. The database can be located on a server that is local to monitoring user, and/or the database can be located remotely (e.g., via so-called "cloud" computing).

The analysis computer 320 can further include an input transducer (not shown), such as a microphone, a keyboard, buttons, or other type. As will be discussed, the monitoring user can input information into the input transducer, which can transmit that information to output transducer of a device, which can then output that information to the device. Further, the monitoring user may configure specific parameters about the capture of data at the device as will be discussed in greater detail in FIG. 3.

Additionally, the analysis computer 320 can include an output transducer (not shown). While the analysis computer 320 can input information into the input transducer, the output transducer can receive that information from the input transducer, and then output that information to the monitoring user. The output transducer can include a speaker and/or a display (i.e., screen, computer monitor, etc.). The display can display video images on a video feed. For example, the display can display video images gathered by the device camera. Further, the speaker can output the sound of the video feed, including voices, background noises, and scout's voices. Thus, the monitoring user can remotely view the area that the device is occupying.

Moreover, the system can further include a communications system that provides communication between the transceiver of the device and the transceiver of the monitoring device. For instance, the communications system can be internet-based, can be a cellular telephone network, can be a wireless network, or can be a satellite communication system, can route information through an Internet cloud-based server, and can be of any suitable type (e.g., 3G, 4G, GSM/GPRSNVi-Fi, LTE, 1009 etc.). Audio data can also be transmitted via conventional telephony (e.g., GSM, CDMA, etc.). The communications system may therefore include a variety of technologies (i.e., internet-based, cellular-based, or satellite-based technologies) along the communications path between the transceiver and the transceiver.

In addition, visual, audio, and other data can be compressed and encoded for transfer over the communications system. For example, video images can be compressed in accordance with a standard such as MPEG-4 or H.264, then transferred over the communications system.

The transceiver of the analysis computer 320 may, accordingly, have a cellular network connection to the communication system. The transceiver of the analysis computer 320 may then have its own cellular network connection to the communication system. These cellular network connections may include any suitable type or specification (e.g., 3G, 4G, LTE, GSM, GPRS, EV-DO, EDGE, HSDPA, or HSPA+). Alternatively, in some embodiments, communication system may have a cellular network connection to transceiver and may thereafter convert from the cellular network communications protocol to an internet communications protocol, for example, so that communication system may have an internet-based connection to transceiver. The transceiver may also have a wireless network connection to the communication system, such as an 802.11-compliant Wi-Fi connection (compliant with 802.11a, 802.11b, 802.11g, and/or 802.11n). It will be appreciated, however, that other communications systems are also within the scope of the present disclosure.

Parts of the analysis computer 320—such as the transceiver, the database, the input transducer, the output transducer (which may include the display), and the positioning system—may therefore be integrated with each other in a variety of ways. For example, in some configurations, the transceiver, the database, the input transducer, the display, and the positioning system may be incorporated in a personal computer. In other configurations, at least the input transceiver, the input transducer, and the output transducer (which may include the display) may be incorporated in a personal computer or a cellular telephone. In further configurations, the database may, along with the positioning system, be incorporated in a server.

Accordingly, the communications system can provide two-way communication between the analysis computer and the scouting device 100. This communication can occur nearly real-time. In nearly real-time communication, data (such as video images gathered by the camera or other data input to the input transducer) may be transmitted directly after being gathered by the camera devices, may be streamed through the communication system, and may be received by the analysis computer 320 and directly displayed on display and/or stored in memory. Such streaming may minimize the latency between the gathering of video images by the device and the viewing of the video images at the analysis computer. As video and image data is captured, it may be sent back to an analysis computer 320 such that a facial recognition procedure may identify the face of an individual in the captured video and image data. The facial recognition procedure is described next with respect to FIGS. 4A/B.

Figure 4A:
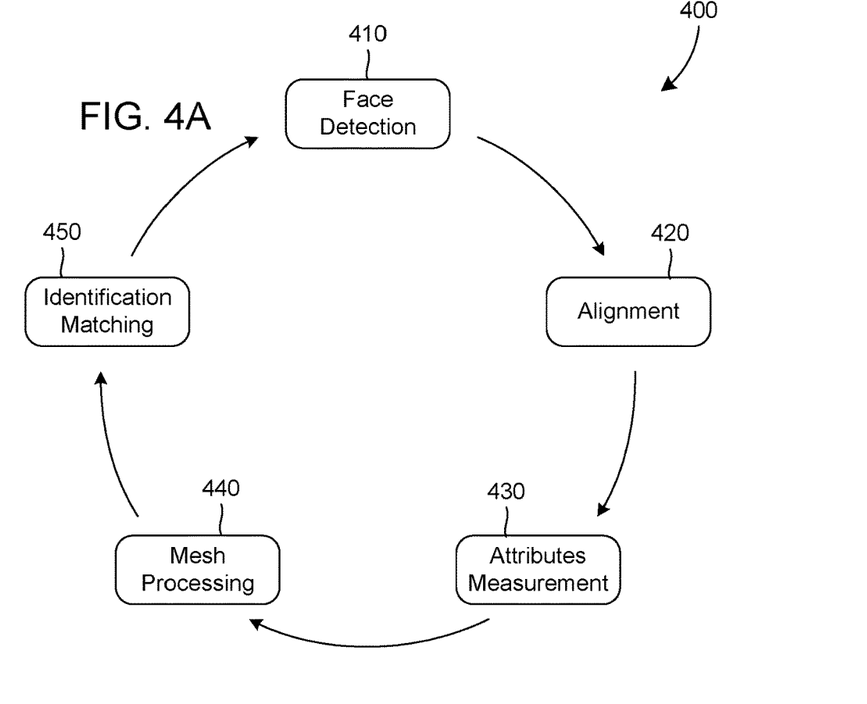
FIGS. 4A/B are respectively a flow diagram and a block diagram for realizing a process for capturing video data regeneration of reference views for conducting a facial recognition procedure according to an embodiment of the present disclosure.
Figure 4B:
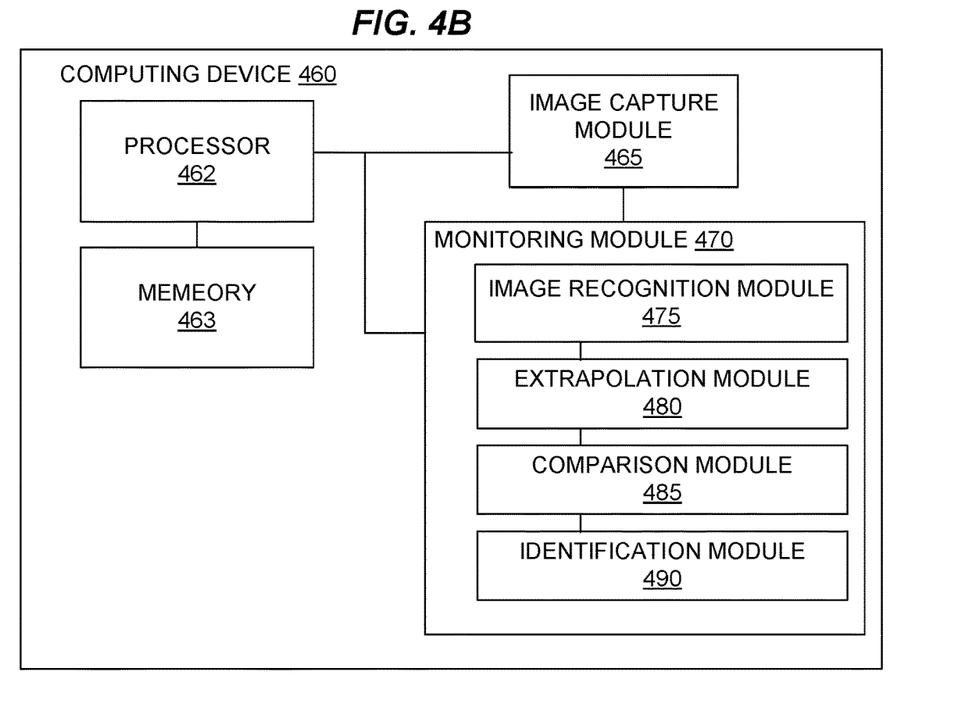

FIG. 4A is a flow diagram 400 for a process for capturing video data for regeneration of reference views in the context of conducting a facial recognition procedure according to an embodiment of the present disclosure. The facial recognition process may begin with detection of face (step 410). In one embodiment, the known facial detection algorithms may be used, such as discussed in "Robust Real-Time Face Detection." P. Viola and M. J. Jones, International Journal of Computer Vision 57(2), 137-154, 2004, or "*The FERET Verification Testing Protocol for Face Recognition Algorithms*," Rizvi et al., Technical report of NISTIR 6281, October 1998, the disclosures of which are incorporated herein by reference. As faces are detected in the captured video data, the algorithm may then look for alignment data from the captured image data (step 420). Such alignment data may be characterized in terms of how far away from a straight on view is the captured data. For example, aspects of a human face are identified as views of the face. Once, this alignment data is generated, measurement of facial attributes may be conducted (step 430) so as to begin the basis for comparison to a database of facial attributes during an analysis phase. As will be discussed further, additional alignment views may be generated based on available information so as to bolster the analysis. Once all alignment data and facial attribute measurement is finished, the procedure may turn to comparative matching (mesh processing, step 440) and then finally to actual identification (step 450).

The facial analysis software, in an embodiment, may utilize three individual "Mesh" algorithms for singular subject identification. Mesh 1 represents eigenvector of facial attributes, Mesh 2 represents a linear discriminant analysis, and Mesh 3 is local binary pattern histogram measurement. This identification may be performed based on conversion of the captured image by using the three different algorithms, and then the converted data is compared with references with the same base. Higher the agreement between these algorithms, the better is the probability of unique identification of the subject. Rarely do all three algorithms have a perfect match, so statistical determinants are used to give a confidence level in subject identification. The resolution of the mesh can be increased or decreased to obtain finer details in analysis. The threshold limits may be imposed to cutoff unreasonable deviation.

FIG. 4B is a block diagram for a computing device 460 having software and/or hardware blocks (sometimes called modules) typically under the control of a processor 462 configured to execute computer readable instruction stored in a memory 463. In this embodiment, the computer-executable instructions are suitable for capturing video data for regeneration of reference views in the context of conducting a facial recognition procedure according to an embodiment of the present disclosure. The device 460 may be a mobile computing device or a stationary "desktop" computing device, examples of which are described below with respect to FIG. 10. The device 460 may include an image-capture module 465 configured to capture local image data during the process step 410 of detection described above with respect to FIG. 4A. As faces are detected in the captured video data, the device may then execute a monitoring module 470 using the algorithm described abobe in FIG. 4A to look for alignment data from the captured image data (step 420). Such alignment data may be characterized in terms of how far away from a straight on view is the captured data. For example, aspects of a human face are identified as views of the face. A first module utilized in this algorithmic process includes an image recognition module 475 that begins to analyze the captured image data. Next, an extrapolation module 480 may generate additional "missing" data based on facial views unseen in the captured image data. This extrapolation process is described in greater detail below with respect to FIGS. 6-7. Once all recreated views are extrapolated, a comparison module 485 generates alignment data and measures facial attributes may (step 430 in FIG. 4A above) so as to begin the basis for comparison to a database of facial attributes during an analysis phase. Once all alignment data and facial attribute measurement is finished, the procedure may turn to comparative matching (mesh processing, step 440) and then finally to actual identification (step 450) at an identification module 490.

Figure 5:
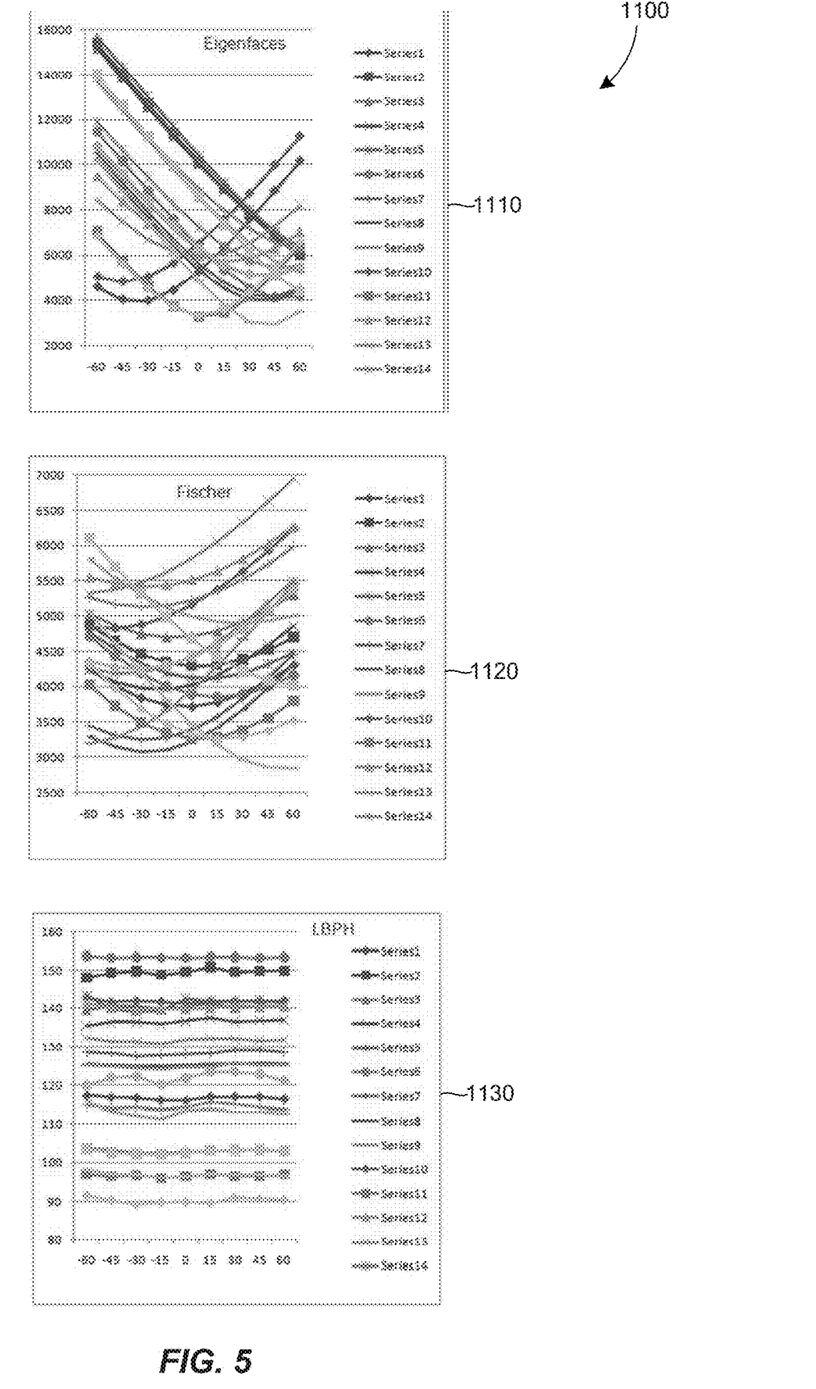
FIG. 5 is exemplary charts describing how the captured image is matched with reference images by using three algorithms according to an embodiment of the present disclosure.

FIG. 5 is exemplary charts 1100 describing how the captured image is matched with reference images by using three algorithms according to an embodiment of the present disclosure. For example, the chart 1110 shows the matched result using Eigenfaces algorithm, the chart 1120 shows the matched result using Fischer algorithm, and the chart 1130 shows the matched result using LBHP algorithm. These examples show the minimal point where match occurs. The comparison is each measured with zero variance of brightness adjustment for series of comparison matches. The eigenvectors of the covariance matrix associated with a large set of normalized pictures of faces are called eigenfaces and these values are principle measurements for comparison.

Figure 6A:
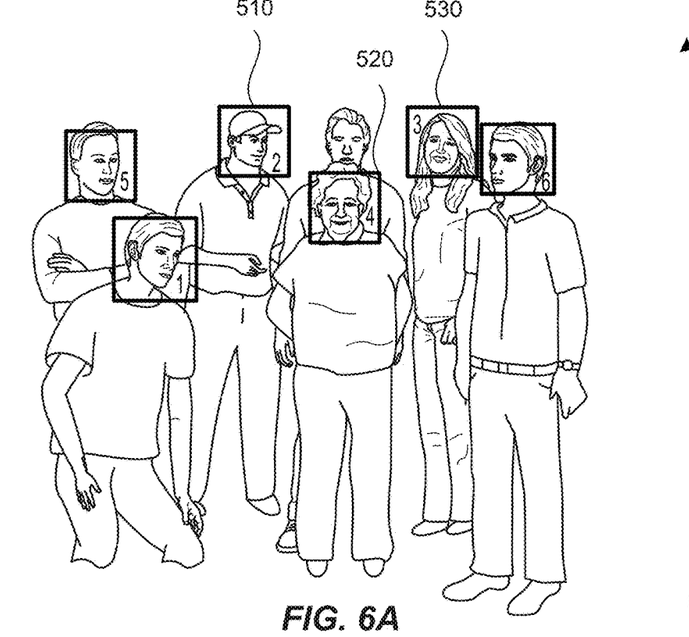
FIG. 6A is a screen shot of a command and control view of an individual who presents a partial facial view from a remote video feed according to an embodiment of the present disclosure.

FIG. 6A is a screen shot 500 of a command and control view of a group of individuals who may be part of a captured image such that facial recognition may take place according to an embodiment of the present disclosure. As shown here, the analysis of the image may identify several faces (for example, 510, 520, 530) upon which the facial recognition algorithm may be conducted. The procedure may be conducted simultaneously on all individuals in the image. As is typically the case, the individual in captured video will rarely be looking at the camera straight on. As such, various facial features may be captured as best as possible given the view available from the video feed. The features in which an analysis may typically be based include distances between recognized features such as eyes, nose, mouth, hair line, jaw line and other facial features. Various data points may be calculated based on the images received and compared against features stored in a database. As more and more data points are accumulated, a greater level of certainty in an identification may be realized.

Figure 6B:
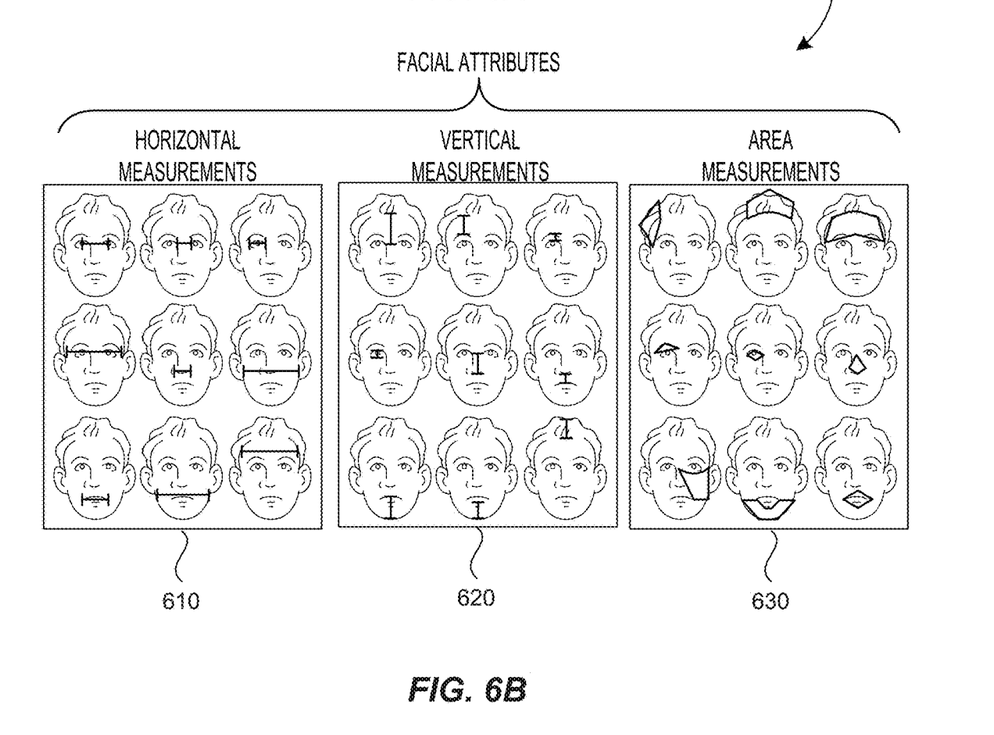
FIG. 6B is a series of facial views showing several different facial attribute measurements that are possible when collecting data from captured video images according to an embodiment of the present disclosure.

FIG. 6B is a series of facial views 600 showing several different facial attribute measurements that are possible when collecting data from captured video images according to an embodiment of the present disclosure. The database of identifications may be a remotely accessible database that may be accessed by several different analysis computers simultaneously (e.g., a national ID database). The analysis of features may be based on the actual images from the video feed and may also be based upon supplemental images that are generated from the actual images. Generally speaking, the more data points available for facial recognition analysis, the greater certainty that the identification is correct. Thus, the system here may create additional images in several desired view of an individual's face. The measurements are performed horizontally 610, vertically 620, and by area 630. For example, the horizontal measurements 610 may be calculated for the length between eye balls, the length between the eye edges, the length of each eye, the length between the temples, the width of the nose, the width of face, the length of the lips, the length of the chin, or the width of the forehead. Further, the vertical measurements 620 may be calculated for the height between the eyes to the hair line, the height of the forehead, the length between the eye brows and eyes, the height of the eyes, the height of the nose, the length between the nose to the lips, the length of the lips to the chin, the height of the chin, and the height from the hair line to the top of the head. In addition, the area measurements 630 may be calculate for the areas of temple, the top of the head, forehead, eyebrows, eyes, nose, check, chin and mouth.

The facial view generation module can utilize two or more views from a frontal perspective and either a left or a right-side view and then generate a range of views in 15 degree increments in terms of rotations left to right and rotations from top to bottom. In similar fashion as 3D view can be generated from front, side and top views, reverse is also possible from 3D view. The various generated views are shown in FIGS. 6 and 7 as discussed next.

Figure 7:
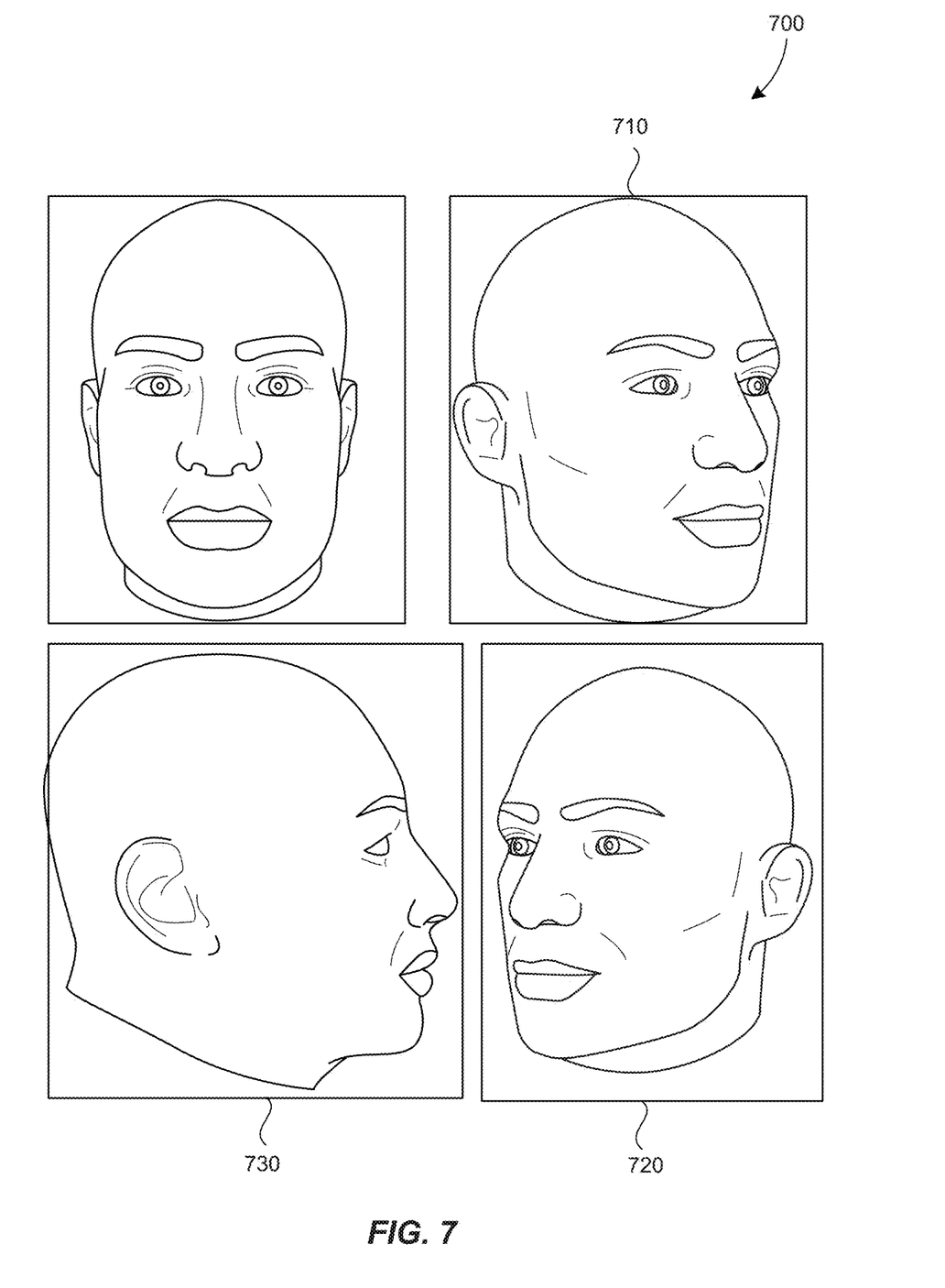
FIG. 7 is a series of recreated views of a face for use with facial recognition analysis wherein the views are rotational views from a horizontal rotation perspective according to an embodiment of the present disclosure.

FIG. 7 is a series of recreated views of a face 700 for use with facial recognition analysis wherein the views are rotational views from a horizontal rotation perspective according to an embodiment of the present disclosure. In an embodiment, the horizontal rotation degree intervals include:

+/−15 degree from frontal or 75/105 degree,
+/−30 degree from frontal or 60/120 degree,
+/−45 degree from frontal or 45/135 degree (for example, 710, 720),
+/−60 degree from frontal or 30/150 degree,
+/−75 degree from frontal or 15/165 degree (optional),
+/−90 degree from frontal or 0/180 degree (one of these exists, for example, 730).

Additional increments may be included.

Figure 8:
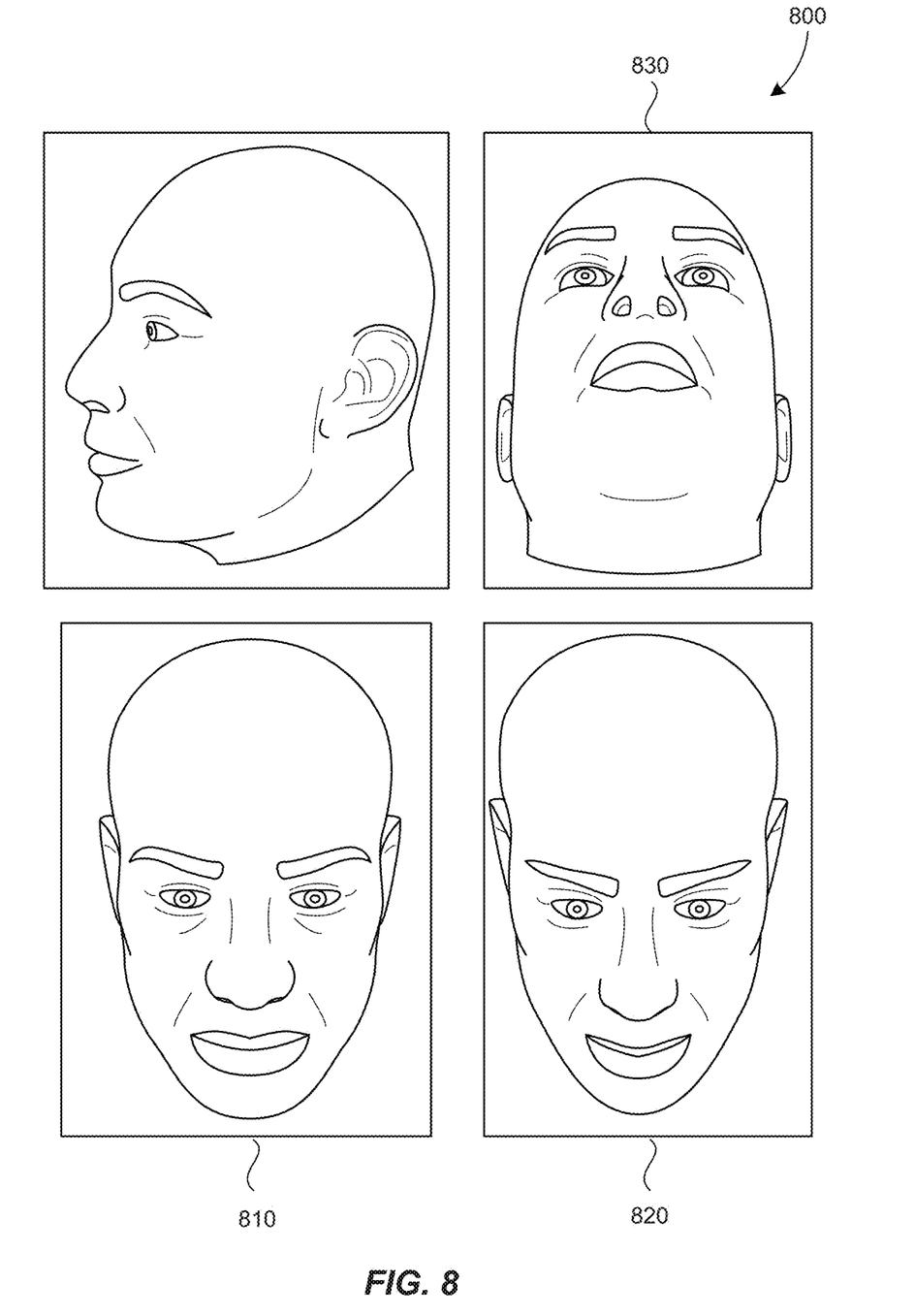
FIG. 8 is a series of recreated views of a face for use with facial recognition analysis wherein the views are rotational views from a vertical rotation perspective according to an embodiment of the present disclosure.

FIG. 8 is a series of recreated views of a face 800 for use with facial recognition analysis wherein the views are rotational views from a vertical rotation perspective according to an embodiment of the present disclosure. In an embodiment, the horizontal rotation degree intervals include:

+/−15 degree from frontal vertically or 15/−15 degree,
+/−30 degree from frontal vertically or 30/−30 degree (for example, 810),
+/−45 degree from frontal vertically or 45/−45 degree (for example, 820, 830).

Additional increments may be included.

Figure 9:
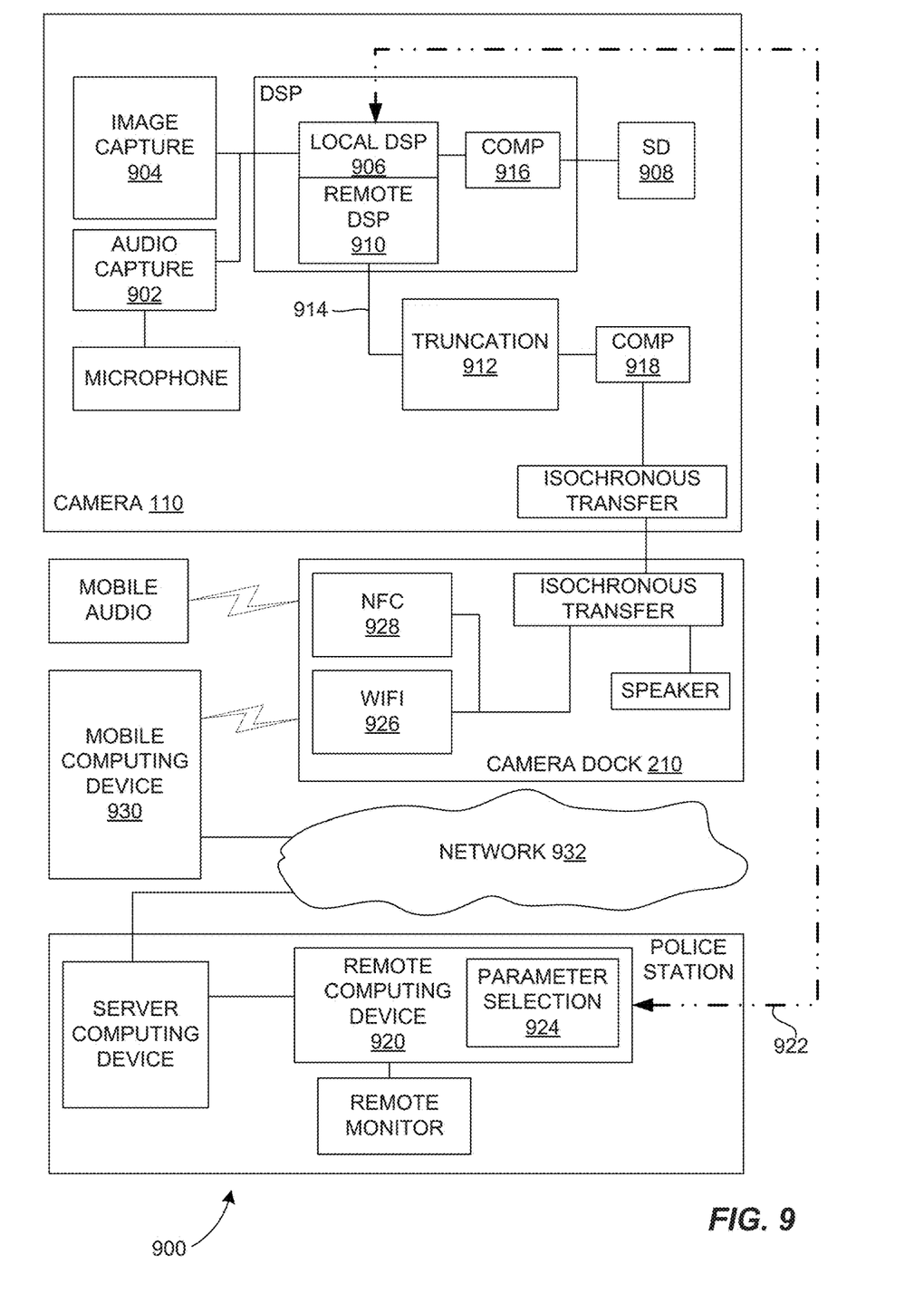
FIG. 9 is a block diagram of a system for remotely capturing video data streams and communicating the captured video data streams to a computing system for facial recognition analysis according to an embodiment of the present disclosure.

FIG. 9 is a block diagram 900 of a system for remotely capturing video data streams and communicating the captured video data streams to a computing system for facial recognition analysis utilizing the audio and video capture device and system of FIG. 1 according to an embodiment of the present disclosure. The system includes a camera device 110, a camera dock 210, a local computing device 916 and an analysis computing device 920. The camera 110 may include functionality for capturing audio 902 and video 904 at high resolution and bit depth. Local digital signal processing (DSP) 906 may store the captured audio and video at a local memory 908 at high resolution and quality through a first data stream. Further remote DSP 910 may truncate 912 a second data stream to be sent to a remote location through one or more communication channels 914 at a different lower resolution and quality. Thus, concurrent data streams maybe processed by computers 916 or 918 of the camera device 110. Further, a remote analysis computing device 920 may be able to send communication signals 922 to the camera device 110 in order to set the parameters 924 of the local stream and the parameters of the network stream. In other embodiments, the full resolution video signal may be sent to the remote analysis computer 920.

In this manner, the system provides a series of images that may include one or faces of individuals that may be analyzed for facial features such that a match to features stored in a database may be able to identify the individual in the image(s). As is further discussed below, these video images may have a limited view of a face. In such cases, additional information about facial features may be extrapolated and inferred from video data that is available. Then, the actual video data and the extrapolated video data may be analyzed to find an identification match from a database of identifications. The determined identification along with degree of certainty information may be sent back to the camera system and displayed on a display for the user to see.

The camera body may contain a 1MP (optional 2MP) camera, Omnivision and an OV 9712 image sensor will be used. This will satisfy 720P video. There will be two (2) circuits for video/audio: One circuit will store 720P (1280×720) @30 fps continually into 32 GB/64 GB/128 GB SD card in loop store mode in H.264 compressed format that will provide access to video/audio files to transfer out dynamically (details associated with Wi-Fi transmitter below) and a path to transmitter will be available for dynamic transfer as is the case with second circuit. Second circuit will parse the (1280×720) from camera above and compress H.264 video in CIF (352×288) or other applicable frame sizes, command control for H.264 and required fps is 1,3,5,10,15,30 and includes a singular pictures in JPEG format as requested by commands from controller. All other parameters of camera are under a command control. This will be fed to 802.11 b/g/n transmitter in dock station. Audio associated with camera can be compressed and packaged with video, microphone & speaker needs to be accessible to Bluetooth transmitter in the dock system. A path to transmitter of video/audio data should be either optical cable or serial USB link Power to the camera system may be provided by two wires from dock station 210. Inside of camera system, there may be a "super capacitor 0.25 Farad or as required" to provide some backup power on disconnect from the dock station 210. As Li-Ion battery (not shown) has limited number of charge/discharge cycles, the dock station 210 may have a provision for charging Li-Ion polymer batteries through mini USB connector. Video data can be downloaded from camera module (not shown) while connected to PC with USB A & 4 Band Analog connector with assistance of mode PB on camera module. Video files on SD card 908 will not be accessible without proper login using username and password on PC, as it contains confidential and privileged information. The dock station 210 may have also female USB A connector that will allow a smart phone 930 to charge when required by using the phone charging cord. Li-Ion batteries in the dock station 210 may be for sustaining operation of camera module and Wi-Fi module 926 or near field communications (NFC) module 928. Alternatively, Bluetooth module (not shown) may communicate for minimum 12 hours of continual use with suggested capacity of 4,000 mAh (300 mA times 12 hours). For additional requirement for phone charging, additional 2,500 mAh is required, so total 6,500 mAh is required.

Commands to control parameters of the scouting device 100 may include commands that are sent from phone app to camera (or dock station) or from the network 432. The commands are provided to configure/stop/start video streaming and followings are the examples of commands:

Rotate Video (param: degree)—This command may rotate the video by the degrees passed as a parameter. The value of degrees will may be entered as 0 or 180 degrees. This command may be sent to the scouting device 100 before starting the video.

Start Video—This command may start the video with the preconfigured parameters.

Stop Video—This command may stop the video.

Picture (param: resolution)—This command may get a snapshot picture of the current video in JPEG format. The resolution of the picture may be specified as a parameter in the command. The camera supports a range of the resolution, and the resolution typically ranges from 352×288 to HD resolution. The resolution of the captured picture may be same as that of the resolution specified in the command parameter. This command may be issued while the video is being recorded. A picture snapshot may be sent to the app in parallel to the video stream being sent.

Focus—This command may focus the lens on the object at the center of the field of vision. This command may adjust the lens to focus on small items (like printed material or small logo or bar code). The object around a distance of half to three feet from the camera lens can be focused. This command may be followed by Picture command, which may be used to take a snapshot picture of the object. This command may be issued while the video is being recorded such that the video's focus also changes accordingly.

Reset Focus—This command may reset the focus so that the camera can go back to the normal mode of operation (the default focus it uses while the video is being recorded)

Resolution (Set/Get)—"Get Resolution" command may return the current resolution. "Set resolution" command should set resolution as the applied value. The resolutions may apply as: 160×120, 176×144, 352×288, 640×480, 1280×720.

Frame rate (fps) (Set/Get)—"Get FrameRate" command may return the current frame rate. "Set FrameRate" command may set the frame rate as the applied value. The frame rates may apply as: 1, 3, 5, 10, 15, 20, 25, and 30. This frame rate (fps) applies only to the video that is being streamed to the application. In one embodiment, the video stored in an SD card may be by default stored as 1280×720 resolution video at 30 fps; however, other rates are possible.

Bit rate (Set/Get)—"Get BitRate" command may return the current bit rate. "Set BitRate" command may set the bit rate as the applied value. The bit rates may apply all values from 50 kbps to 2000 kbps.

Brightness (set/Get)—"Get Brightness" command may return the current brightness of the streaming video. "Set Brightness" command may set the brightness as the applied value.

Contrast (set/Get)—"Get contrast" command may return the current contrast of the streaming video. "Set contrast" command may set the contrast as the applied value.

Configuration Changed—On receiving this command, a camera may start streaming with newly configured parameters. When the video is streaming, the phone app can change the configuration parameters (like resolution, bit rate or frame rate). Once all the relevant parameters are changed, the app may issue the "Configuration changed" command.

Get Stored Video (Start Time Code, End Time Code)—On receiving this command, the camera may return the stored video on an SD card in the agreed format. The video may cover the duration from 'Start time code' to 'End time code.'

Mark Stored Video (Time code, marker name)—This command sets a marker at the given timecode in the video that is stored in SD card. The name of the marker may be stored for later retrieval purposes. As the video is stored in a circular buffer, when the video at the timecode is overwritten, the marker may be deleted.

Get Markers—The video may return a comma separated list of all the markers currently in the system. For instance, if the markers are "marker 1," "marker 2," "marker 3," then this command may return "marker 1, marker 2, marker 3."

Get Marker TimeCode (param: marker name)—This command may return the time code at which the marker of given name is tagged. The parameter of the method is the marker name for which the time code is required.

In addition to commands, events are notifications sent from camera (or dock station) to phone application and they start due to the user action or change in operating environment. They are asynchronous in nature and may be notified to Phone App. The phone may not poll for the events. Instead, the phone app will receive these notifications asynchronously. The followings are the examples of events:

Button click—When the user clicks any one or both the buttons in the dock station, the phone app may be informed immediately. The status parameter may tell which buttons were pressed.

Video Error—When there is an error in the video stream due to power or any other reason, the phone app may be informed immediately. The status parameter may tell which parameters are pressed.

Camera Applications (Real-time facial capture and recognition)—Facial recognition module is server-based software utilizing face detection, regeneration of references, and mesh algorithm network processing illustrated below. Regeneration of references assures right identification of subject under varying conditions.

Remote activation of record—Records are available for remote or local marking identification, and also for remote or local wireless transfer of marked content along with manually generated markers to server storage.

DL scan and process—2D or matrix code readers are widespread on Android & iPhone for most popular 2D code formats. smart phone is integral part of the solution, risk factor of software development is totally mitigated. Wide-angle camera distortion is a singular development item focus.

LP VR recognition and process—The command structure uses VR engine and that along with pictorial snapshot will provide detailed information required for License Plate identification.

Dynamic resolution/FPS management—Command control of configuration is via smart phone and its connection with a server and remote site. Simple hovering of mouse on video frame at the observation platform results in changes to camera action.

Figure 10:
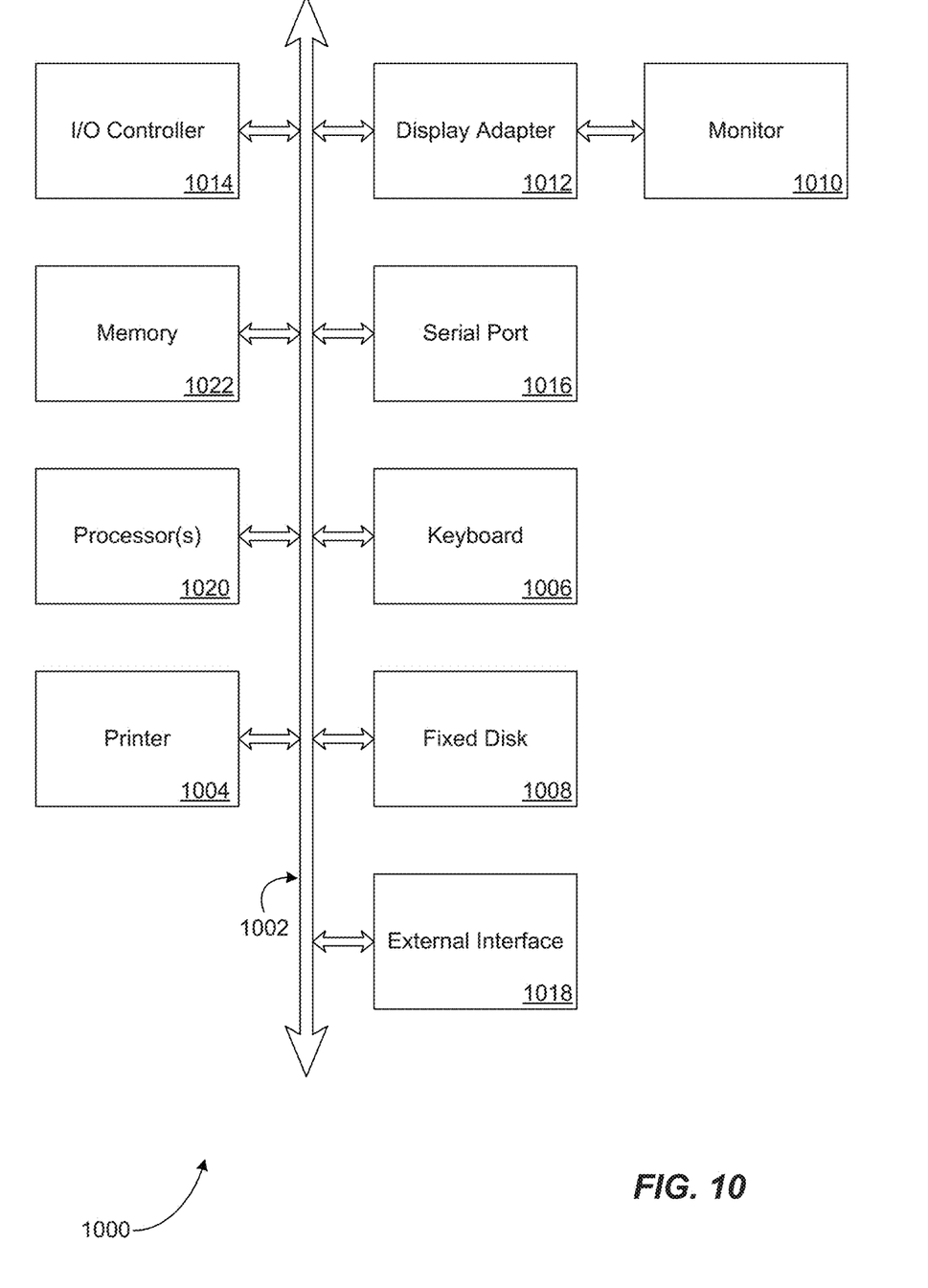
FIG. 10 is an exemplary computing environment that is a suitable representation of any computing device that is part of the audio and video capture device and system of FIG. 1 according to an embodiment of the present disclosure.

FIG. 10 is a diagram illustrating elements or components that may be present in a computer device or system 1000 configured to implement a method, process, function, or operation according to an embodiment of the present disclosure. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system.

The subsystems shown in FIG. 10 are interconnected via a system bus 1002. Additional subsystems include a printer 1004, a keyboard 1006, a fixed disk 1008, and a monitor 1010, which is coupled to a display adapter 1012. Peripherals and input/output (I/O) devices, which couple to an I/O controller 1014, can be connected to the computer system by any number of means known in the art, such as a serial port 1016. For example, the serial port 1016 or an external interface 1018 can be utilized to connect the computer device 1000 to further devices and/or systems not shown in FIG. 8 including a wide area network such as the Internet, a mouse input device, and/or a scanner. The interconnection via the system bus 1002 allows one or more processors 1020 to communicate with each subsystem and to control the execution of instructions that may be stored in a system memory 1022 and/or the fixed disk 1008, as well as the exchange of information between subsystems. The system memory 1022 and/or the fixed disk 1008 may embody a tangible computer-readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A computing method, comprising:
    capturing image data using an image capture device, the captured image including a portion that can be identified as a human face;
    identifying aspects of the human face that can be associated with a specific view of the human face;
    extrapolating additional aspects of the identified human face based on the identified aspects;
    generating at least one additional view that is different from the specific view identified in the captured image data in response to the identified aspects and the extrapolated aspects;
    comparing the specific view and the at least one additional view with data in a database; and
    determining an identification of the human face based on the comparison.

2. The method of claim 1, further comprising providing, to a remote computing device, the identification identified in response to the comparison with the database.

3. The method of claim 2, further comprising:
    identifying one or more features of the human face image;
    measuring one or more distances between each of the identified features of the individual face; and
    generating the one or more additional views of the human face image in response to the measurement.

4. The method of claim 3, wherein identifying the features of the human face image further comprises identifying at least one of an eye, nose, mouth, hair line, jaw line, ear, and eye brow.

5. The method of claim 3, wherein the generating the one or more additional views of the human face further comprises generating at least one of a vertical-rotational view or a horizontal-rotational view.

6. The method of claim 2, wherein the one or more additional views further comprise three-dimensional views.

7. The method of claim 1, further comprising simultaneously identifying a plurality of images of a plurality of individuals in the captured image data.

8. The method of claim 1, further comprising generating initial image data from a video stream of data.

9. The method of claim 1, wherein the captured image comprises a series of images.

10. A device, comprising:
    an image-capture module configured to capture local image data;

a monitoring module coupled to the image capture module, the monitoring module further comprising:
    an image-recognition module configured to identify attributes of an image of an individual in the captured image data;
    an extrapolation module configured to extrapolate a set of views of the individual based on the captured individual image;
    a comparison module configured to determine a closest match of the set of views to an individual associated with a previously stored set of views in a database communicatively coupled to the monitoring device; and
    an identification module configured to determine identification of the individual based on the closest match.

11. The device of claim 10, further comprising a communication module coupled to the monitoring module and configured to send the determined identification of the individual to a remote computing device.

12. The device of claim 11, wherein the communication module is configured to communicate data isochronously.

13. The device of claim 11, wherein the communication module is further configured to send the captured image to a remote computing device for monitoring concurrent with the determining identification of the individual.

14. The device of claim 10, wherein the captured image data comprises video stream data.

15. The device of claim 10, wherein the set of views of the individual are stored in a database.

16. A system, comprising:
    an audio/video (NV) data capture device configured to capture audio/video (NV) data;
    a monitoring device communicatively coupled to the A/V data capture device and further configured to:
        identify an image of an individual in the captured AN data;
        identifying aspects of a human face of the individual that can be associated with a specific view of the human face;
        extrapolating data from the captured A/V data to generate a plurality of additional views of the human face based on the image of the individual;
        comparing the plurality of additionally generated views with data stored in a database communicatively coupled to the monitoring device; and
        determine an identification of the individual based on the comparison; and
    a remote computing device for hosting the database and configured to communicate with the monitoring device.

17. The system of claim 16, wherein the monitoring device is further configured to concurrently send additional captured A/V data while receiving identification of the individual from the remote computing device.

18. The system of claim 16, wherein the monitoring device comprises a speaker for outputting audio data identifying the individual from the captured A/V data.

19. The system of claim 16, wherein the communication between the monitoring device and the remote computing device comprises one of a near-field communication or Wi-Fi communication.

20. The system of claim 16, the monitoring device further configured to:
    identify one or more features of the individual face image;
    determine an alignment of the individual face image as an initial view;
    measure one or more distances between each of the identified features of the individual face; and
    generate the one or more additional views of the individual face image in response to the determined alignment and measurement.

\* \* \* \* \*

UNITED STATES PATENT AND TRADEMARK OFFICE
CERTIFICATE OF CORRECTION

PATENT NO.        : 10,803,299 B2
APPLICATION NO.   : 15/922627
DATED             : October 13, 2020
INVENTOR(S)       : Milan Slamka It is certified that error appears in the above-identified patent and that said Letters Patent is hereby corrected as shown below:

In the Claims

Claim 16, Line 2: Please replace "(N/V)" with "(A/V)"

Claim 16, Line 3: Please replace "(N/V)" with "(A/V)"

Claim 16, Line 6: Please replace "AN" with "A/V"

Signed and Sealed this
Seventeenth Day of November, 2020

Andrei Iancu
*Director of the United States Patent and Trademark Office*